United States Patent Office 3,595,928
Patented July 27, 1971

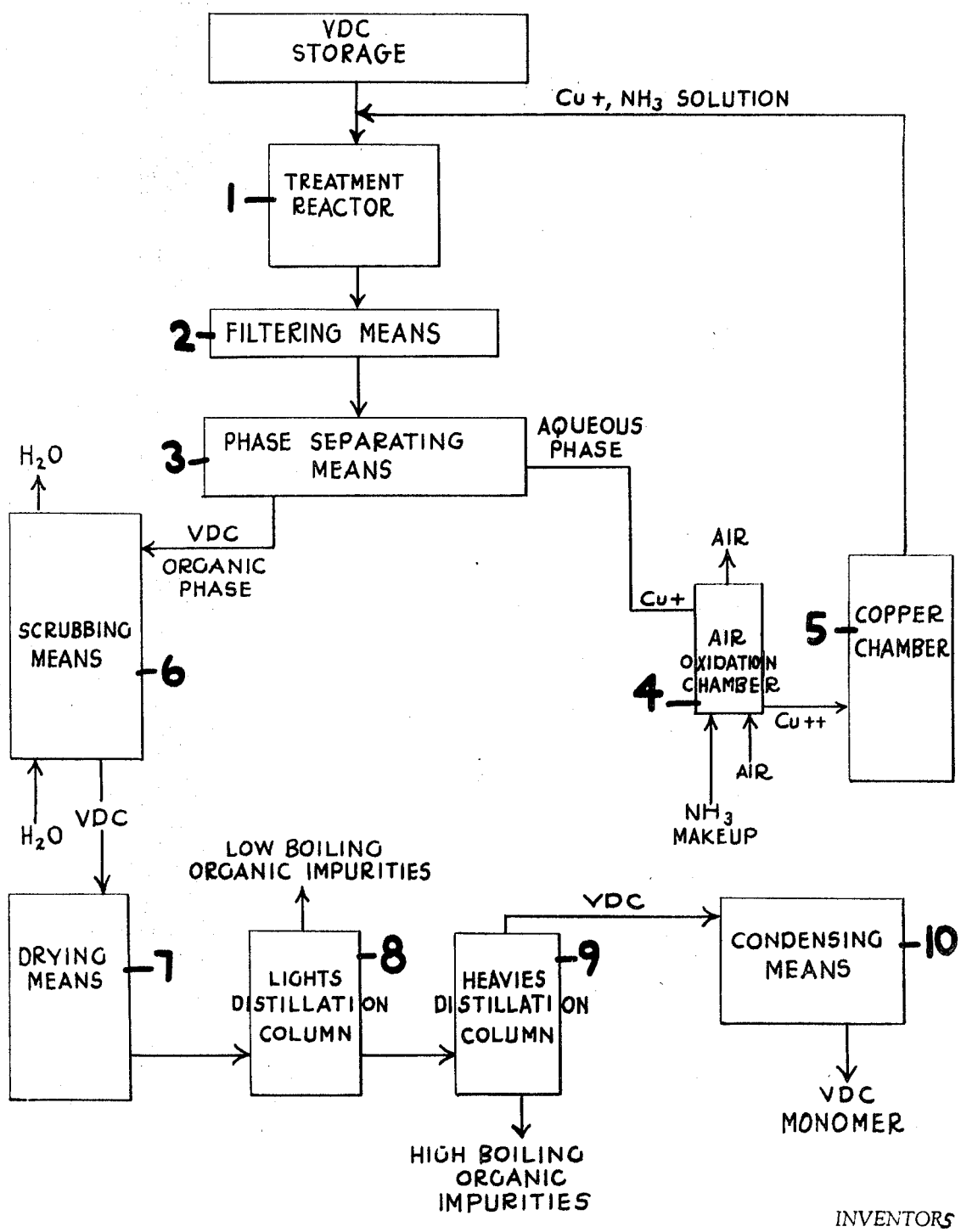

3,595,928
PROCESS FOR PURIFYING VINYLIDENE
CHLORIDE
Walker H. Rideout and William L. Reilly, Corpus Christi, Tex., assignors to PPG Industries, Inc., Pittsburgh, Pa.
Continuation of application Ser. No. 477,755, Aug. 6, 1965. This application May 19, 1969, Ser. No. 830,192
Int. Cl. C07c 21/00
U.S. Cl. 260—654S                             22 Claims

ABSTRACT OF THE DISCLOSURE

Vinylidene chloride monomers are stabilized to prevent the formation of undesirable color bodies by contacting the monomer with at least 2 percent by volume, basis the volume of the monomer, of an aqueous solution containing ions of either silver, copper or mercury; and, desirably, a coordinating ligand which is non-reactive with the monomer and which may be readily phase-separated from the monomer.

---

This application is a continuation of application Ser. No. 477,755, filed Aug. 6, 1965, now abandoned.

This invention relates to the stabilization of vinylidene chloride monomer (VDC).

VDC is known to be an unstable material subject to autogenous decomposition, probably through an oxygen induced free radical process.

Upon standing, VDC degradation typically results in the formation of undesirable color bodies. The degradation is particularly noticeable when the VDC is stored in the presence of mild steel such as the steel drums in which it is typically shipped and stored.

This invention provides a treatment whereby the stability of VDC monomer is enhanced. Thus, VDC treated in accordance with the teachings of this invention evidences markedly increased color stability. The invention is applicable to both crude and highly purified monomer. When the invention is applied to crude monomer, the monomer evidences decreased tendency to polymerize in subsequent physical purification procedures, e.g., distillation.

In the practice of this invention, VDC monomer is treated by contacting it with aqueous media containing silver, copper and/or mercury ions. Aqueous ammoniacal cuprous sulfate solution is particularly useful in the practice of this invention. It has been found, for example, that crude VDC treated for thirty minutes at room temperature by intimate mixing with an equal volume of ammoniacal cuprous sulfate (2% $CuSO_4 \cdot 5H_2O$ in 5% $NH_4OH$) followed by filtration and phase separation, stabilized with 5,000 p.p.m. phenol and stored in the presence of mild steel at 50° C. for 230 hours, had an APHA color value of only 10 to 15 units (Pt-Co Scale). Untreated VDC when subjected to storage under the same conditions was found to have an APHA color value of 100 units after 100 hours. A description of the APHA color test may be found in the book "Standard Methods for the Examination of Water, Sewage, and Industrial Wastes," American Health Association, Inc. (10th ed., 1955) at page 87.

The treatment of VDC monomer in accordance with this invention is best accomplished by intimately mixing the monomer with an aqueous solution of silver, mercury or copper salts. The salts are commonly employed in relatively low concentrations, e.g., about 0.5 to about 5.0 percent by weight, based on the weight of the water in the solution. A coordinating ligand is preferably included in the solution to solubilize the salt, i.e., to complex or stabilize the metal ions in solution.

A wide variety of copper, mercury, and silver salts are employable. In general, any such salt which has the desired solubility in the aqueous solution, including the coordinating ligand is employable. Suitable salts include cuprous salts such as cuprous ammoniacal ferricyanide, cuprous ferrocyanide, cuprous hydroxide, cuprous oxide, cuprous sulfate, cuprous carbonate, cuprous cyanide, cuprous ferricyanide, cuprous sulfide or cuprous thiocyanate; cupric salts such as cupric acetate, cupric ammonium chloride, cupric tetraamine sulfate, cupric bromate, cupric bromide, cupric chlorate, cupric chloride, cupric formate, cupric lactate, cupric nitrate, cupric silicofluoride or cupric sulfate; mercuric salts such as mercuric acetate, mercuric bromide, mercuric chlorate, mercuric chloride, mercuric cyanide, and mercuric oxycyanide; mercurous salts such as mercurous chlorate, mercurous acetate, mercurous formate, mercurous nitrate and mercurous silicofluoride; and silver salts such as silver acetate, silver metaborate, silver chlorate, silver fluoride, silver nitrate, silver perchlorate, silver silicofluoride and silver sulfate. Silver, cuprous, and mercurous ions are preferred because the precipitates formed by these ions are less likely to be explosive than precipitates formed by employing aqueous solutions containing either cupric or mercuric ions. Aqueous cuprous solutions are most preferred. The foregoing list is by way of illustration and is not intended to limit the scope of the invention.

It is desirable to include in the aqueous solutions employed a coordinating ligand to complex the metal ions and solubilize the metal salt. A multiplicity of such ligands are employable, e.g., acetonitrile, succinonitrile, thiourea, ethylenethiourea, cyanide, alkyl phosphines, e.g., triethyl phosphine and tripropyl phosphine, amines such as primary, secondary and tertiary alkyl amines and alkanolamines (wherein the alkyl or alkanol groups contain 1 to 6 carbon atoms), liquid or aqueous ammonia, thiocyanates, e.g., sodium, potassium, or ammonium thiocyanates, excess chloride or iodide ions, pyridine, thioacetamide, dimethylsulfide, and carbon monoxide. Of course, any coordinating ligand which is non-reactive with the monomer and which may be readily phase separated from the monomer is employable. The foregoing list is by way of illustration only and is not intended to limit the scope of the invention. The coordinating ligand is normally employed in relatively small amounts, e.g., about 1 to about 15, rarely less than about 0.5 or more than about 25 percent by weight, basis the water in the solution. The preferred class of coordinating ligands includes aqueous and liquid ammonia and primary, secondary and tertiary alkyl and alkanol amines.

The accompanying drawing is a flow sheet of a pilot plant operated in accordance with the present invention.

Referring to the drawing, crude VDC was fed with an equal volume of ammoniacal cuprous sulfate solution to reactor 1. The solution initially fed to the reactor contained 2 percent by weight $CuSO_4 \cdot 5H_2O$ and 5 percent by weight $NH_4OH$, basis the weight of the water in the solution. The feed rate was about 3.8 gallons crude VDC per hour. The reactor was a three-stage, baffled, stirred vessel. The effluent from the reactor was passed through filter 2 to remove any precipitate formed in the reactor. After filtration, the mixture of VDC and ammoniacal cuprous sulfate solution was phase separated in a 4-inch diameter Pyrex phase separator 3. The aqueous phase was fed from the phase separator by pressure to the air oxidation chamber 4 wherein cuprous ions were air oxidized to cupric ions according to the reaction $Cu^+ + O \rightarrow Cu^{++}$. The pH of the aqueous phase was measured periodically. When the pH fell below 10.0, aqueous ammonia was added to the air oxidation chamber until the pH of the aqueous phase attained 11.0. Air was added to the chamber at the rate of 1 cubic foot per hour for a period of 2 minutes each hour.

The partially oxidized ammoniacal cuprous sulfate solution was pumped from the air oxidation chamber 4 to the copper chamber 5. The copper chamber employed was a 4-inch diameter column of Pyrex pipe with an initial copper packing of about 4 feet. In this chamber, the cupric ions in solution were reduced by the metallic copper to form cuprous ions according to the reaction $Cu^{++} + Cu^\circ \rightarrow 2Cu^+$. The cuprous ions formed in this fashion served to replenish the copper in the aqueous ammoniacal solution. The cuprous containing effluent from the copper chamber was recycled back to reactor 1.

VDC from the phase separator was fed by pressure to a water scrubbing column 6. The column was a 2-inch diameter Pyrex pipe about 6 feet high with a piece of 4-inch diameter Pyrex pipe at the bottom to serve as a surge pot. The function of the scrubber was to remove any traces of the ammoniacal cuprous sulfate solution that might have been carried over from the phase separator 5. VDC from the scrubber was forwarded through a calcium chloride drier 7 which comprised a 4-foot section of 4-inch diameter Pyrex pipe packed with anhydrous (97%) calcium chloride pellets. The drier reduced the water content of the VDC from above about 350 p.p.m. to below about 30 p.p.m. When the resulting product was passed through conventional distillation and condensation equipment 8, 9 and 10 to remove low boiling and high boiling organic impurities, a product purity of above 99.9 percent was routinely achieved.

The VDC monomer employed in the examples was produced as an intermediate in the production of methyl chloroform in accordance with the teachings of U.S. Pat. 3,065,280, the disclosure of which is hereby incorporated by reference. Said patent discloses that vinylidene chloride is produced by the chlorination of ethylene followed by the dehydrochlorination of the resulting 1, 1, 2-trichloroethane with aqueous inorganic alkali oxide or hydroxide. The crude monomer employed in the instant examples was prepared in accordance with the process described in the example of said U.S. Pat. 3,065,280. Thus, the VDC monomer of the examples was prepared by chlorinating ethylene with elemental chlorine to form 1,1,2-trichloroethane and evolve hydrogen chloride. This 1,1,2-trichloroethane was then dehydrochlorinated to form crude vinylidene chloride or VDC (1,1-dichloroethane).

The pilot plant was run 24 hours a day for a period of about six days. Operations were continuous except for minor revisions and maintenance. 2.414 pounds of crude VDC were fed to the pilot plant during this period. 2,367 pounds of VDC product were recovered from the copper treatment section, i.e., prior to being fed through any distillation equipment. The VDC product was then fed through a lights distillation column 8 and a heavies distillation column 9 to remove low boiling organics and high boiling organics, respectively. About 2,307 pounds of purified VDC was recovered from the condenser 10. The condensed monomer was stabilized with $500 \pm 25$ parts per million paramethoxy phenol. A portion of the stabilized monomer was stored in a stainless steel tank. A further portion was stored in conventional 55 gallon steel drums which had first been thoroughly cleaned.

The color stability of the monomer has been found to be enhanced by maintaining the storage vessels as clean as possible. One acceptable cleaning procedure for a steel drum is to rinse the drum thoroughly at least three times with about 2 gallons of steam condensate. The drum should then be cleaned with live steam and thoroughly dried.

The stored VDC was analyzed weekly. The color stability was found to be extremely good. For example, the VDC stored in the stainless steel tank had an APHA color value at the sixth analysis of only 15. Similar values were obtained in the analyses of the VDC stored in clean steel drums.

It will be understood that the aforedescribed invention may be practiced in a variety of embodiments. Thus, for example, the treatment illustrated by the continuous operation of the example may be performed in a batch fashion if desired. It is desirable to keep the solution at a pH above at least about 7 preferably within about 9 and about 11, rarely above 11.5. It has been found convenient to treat the VDC with an approximately equal volume of the aqueous phase. Suitable results may be obtained by using other proportions of aqueous solution. Thus, for example, the VDC may be contacted with a substantially smaller volume of the aqueous phase, i.e., as little as about 3 percent, rarely less than about 2 percent, preferably about 20 to about 150 percent. Although treating VDC with much greater than an equal volume of aqueous solution generally results in recycling inordinately large amounts of the aqueous phase, substantial excesses, e.g., up to several hundred percent are often employable. The concentration of copper, silver or mercury ions desired in the aqueous phase is variable but is conveniently between about 1 and about 4, rarely less than about 0.3 or more than about 5 percent by weight based on the weight of the solution.

Reference to specific details herein is not intended to limit the scope of the invention except insofar as these details are included in the appended claims.

We claim:

1. The method of improving the stability of vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises contacting said monomer with at least about 2 percent by volume, based on the volume of said monomer, of an aqueous solution containing ions selected from the group consisting of silver, mercury, and copper ions and recovering vinylidene chloride monomer.

2. The method of improving the stability of vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises contacting said monomer with at least about 2 percent by volume, based on the volume of said monomers, of an aqueous solution containing ions selected from the group consisting of silver, mercurous and cuprous ions.

3. The method of improving the stability of vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises intimately mixing said monomer with at least about 2 percent by volume, based upon the volume of said monomer, of an aqueous solution containing ions selected from the group consisting of silver, mercury and copper ions, and a coordinating ligand for said ions, said coordinating ligand being selected from the group consisting of acetonitrile, succinonitrile, thiourea, ethylene thiourea, cyanide, triethyl phosphine, tripropyl phosphine, primary, secondary and tertiary alkyl- and alkanol-amines wherein said alkyl and alkanol groups contain one to six carbon atoms, ammonia, sodium thiocyanate, potassium thiocyanate, ammonium thiocyanate, pyridine, thioacetamide, dimethylsulfide and carbon monoxide and recovering vinylidene chloride monomer from the mixture.

4. The method of claim 3 wherein the coordinating ligand is selected from the group consisting of aqueous ammonia, liquid ammonia, and primary, secondary and tertiary alkyl and alkanol amines.

5. The method of claim 3 wherein the pH of the aqueous solution is maintained above about 7.

6. The method of improving the color stability of vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises intimately mixing said monomer with at least about 2 percent by volume, based upon the volume of said monomer, of an aqueous solution of a copper salt containing sufficient coordinating ligand to stabilize the copper ions in said aqueous solution, said coordinating ligand being selected from the group consisting of acetonitrile, succinonitrile, thiourea, ethylene thiourea, cyanide, triethyl phosphine, tripropyl phosphine, primary, secondary and tertiary alkyl- and alkanol-amines wherein said alkyl and alkanol groups contain one to six carbon atoms, ammonia, sodium thiocyanate, potassium thiocyanate, ammonium thiocyanate, pyridine, thioacetamide, dimethylsulfide and carbon monoxide and recovering vinylidene chloride monomer from said mixture.

7. The method of claim 6 wherein the aqueous solution employed contains about 0.3 to about 5 percent by weight of a copper salt, and about 1 to about 15 percent by weight ammonium hydroxide, based on the weight of water in said solution.

8. The method of improving the color stability of vinylidene chloride monomer containing a contaminant present in vinylidene chloride produced by the chlorination of ethylene followed by the dehydrochlorination of the reuslting 1,1,2-trichloroethane with aqueous inorganic alkali oxide or hydroxide which comprises intimately mixing said monomer with at least about 2 percent by volume, based upon the volume of said monomer, of an aqueous solution of a copper salt containing sufficient coordinating ligand to stabilize the cuprous ions in said aqueous solution, said coordinating ligand being selected from the group consisting of acetonitrile, succinonitrile, thiourea, ethylene thiourea, cyanide, triethyl phosphine, tripropyl phosphine, primary, secondary and tertiary alkyl- and alkanol-amines wherein said alkyl and alkanol groups contain one to six carbon atoms, ammonia, sodium thiocyanate, potassium thiocyanate, ammonium thiocyanate, pyridine, thioacetamide, dimethylsulfide and carbon monoxide and recovering vinylidene chloride monomer from said mixture.

9. A method of treating vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide to improve its color stability which comprises feeding the monomer to a reactor, simultaneously feeding at least about 2 percent by volume, based upon the volume of said monomer, of an aqueous solution containing ions selected from the group consisting of silver, mercury, and copper ions to the reactor, forwarding the mixture through a filtering means to remove solids therefrom, forwarding the filtered mixture to a phase separating means wherein the aqueous phase is removed and recycled to the reactor and recovering vinylidene chloride monomer from said phase separating means.

10. The method of claim 9 wherein the aqueous solution contains a coordinating ligand for the recited metal ion contained therein, said coordinating ligand being selected from the group consisting of acetonitrile, succinonitrile, thiourea, ethylene thiourea, cyanide, triethyl phosphine, tripropyl phosphine, primary, secondary and tertiary alkyl- and alkanol-amines wherein said alkyl and alkanol groups contain one to six carbon atoms, ammonia, sodium thiocyanate, potassium thiocyanate, ammonium thiocyanate, pyridine, thioacetamide, dimethylsulfide and carbon monoxide.

11. The method of claim 10 wherein the coordinating ligand is ammonia.

12. The method of claim 9 wherein the vinylidene chloride recovered from the phase separating means is scrubbed with water to remove residual aqueous phase.

13. The method of claim 12 wherein the vinylidene chloride monomer is crude vinylidene chloride monomer and subsequent to being scrubbed it is passed to distillation means to remove organic impurities therefrom.

14. The method of improving the color stability of vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises simultaneously feeding the monomer and about 20 to about 150 volume percent based on the volume of the monomer of an aqueous solution containing at least about 0.3 weight percent based on the weight of the solution of copper ions and a coordinating ligand, to stabilize copper ions in said solution to a reactor, said coordinating ligand being selected from the group consisting of acetonitrile, succinonitrile, thiourea, ethylene thiourea, cyanide, triethyl phosphine, tripropyl phosphine, primary, secondary and tertiary alkyl- and alkanol-amines wherein said alkyl and alkanol groups contain one to six carbon atoms, ammonia, sodium, thiocyanate, potassium thiocyanate, ammonium, thiocyanate, pyridine, thioacetamide, dimethylsulfide and carbon monoxide, forwarding the resulting mixture from the reactor through a filtering means to a phase separating means and recovering vinylidene chloride monomer from said phase separating means, while recycling said aqueous solution from said phase separating means to said reactor.

15. The method of claim 14 wherein the aqueous solution is an aqueous ammoniacal solution containing dissolved copper salts.

16. The method of claim 14 wherein the aqueous solution is an aqueous ammoniacal solution of a cuprous copper salt.

17. The method of claim 16 wherein the aqueous solution is an aqueous ammoniacal solution of cuprous sulfate.

18. The method of treating vinylidene chloride monomer containing a contaminant present in vinylidene chloride produced by the chlorination of ethylene followed by the dehydrochlorination of the resulting 1,1,2-trichloroethane with aqueous inorganic alkali oxide or hydroxide which comprises intimately mixing the monomer in a reactor with at least about 20 volume percent based on the volume of the monomer of an aqueous ammoniacal solution of cuprous sulfate containing at least about 0.3 weight percent based on the weight of the solution of cuprous ions, passing the mixture through a filtering means to a phase separating means, recovering vinylidene chloride from said phase separating means while forwarding the aqueous ammoniacal solution from said phase separating means to an air oxidation chamber wherein air is passed through the solution to oxidize the cuprous ions to cupric ions, passing the aqueous solution from the air oxidation chamber to a chamber containing copper metal wherein the cupric ions and the copper metal are reacted to form cuprous ions and recycling the aqueous solution from the copper containing chamber to the reactor.

19. The method of claim 18 wherein the pH of the aqueous solution is maintained above about 7 by adding ammonia as required.

20. The method of claim 19 wherein the ammonia additions are made to the aqueous solution in the air oxidation chamber.

21. The method of claim 18 wherein the vinylidene chloride recovered from the phase separator is scrubbed with water to remove residual aqueous ammoniacal solution.

22. The method of claim 21 wherein the vinylidene chloride monomer is crude vinylidene chloride and after being scrubbed the monomer is dried and distilled to remove organic impurities therefrom.

References Cited

UNITED STATES PATENTS

| | | | |
|---|---|---|---|
| 2,993,789 | 7/1961 | Crawford | 260—652.5 |
| 2,255,483 | 9/1941 | D'Alelio | 260—622.5 |
| 2,125,685 | 8/1938 | Nicodemus et al. | 260—652.5 |

FOREIGN PATENTS

| | | | |
|---|---|---|---|
| 236,001 | 10/1961 | Australia | 260—652.5 |

OTHER REFERENCES

Moller: "Inorganic Chem.," p. 826 (1952).

BERNARD HELFIN, Primary Examiner

G. A. SCHWARTZ, Assistant Examiner

U.S. Cl. X.R.

23—55, 103; 260—652.5R, 652.5P